United States Patent [19]
Aida et al.

[11] Patent Number: 5,093,739
[45] Date of Patent: Mar. 3, 1992

[54] LIQUID CRYSTAL DISPLAY DEVICE AND RETARDATION FILM

[75] Inventors: Kazuhiko Aida, Toyosaka; Osamu Yoshimura, Nakajo; Motonao Arai, Fujiyoshida; Satofumi Koike, Isehara, all of Japan

[73] Assignee: Citizen Watch Co., Okayama, Japan

[21] Appl. No.: 678,320

[22] PCT Filed: Jun. 20, 1990

[86] PCT No.: PCT/JP90/00805
§ 371 Date: Apr. 29, 1991
§ 102(e) Date: Apr. 29, 1991

[87] PCT Pub. No.: WO90/16006
PCT Pub. Date: Dec. 27, 1990

[30] Foreign Application Priority Data
Jun. 22, 1989 [JP] Japan .................. 1-159981
Aug. 15, 1989 [JP] Japan .................. 1-210390

[51] Int. Cl.$^5$ .................................. G02F 1/133
[52] U.S. Cl. ............................ 359/73; 359/102
[58] Field of Search ........................ 350/347 R

[56] References Cited
U.S. PATENT DOCUMENTS
4,844,569 7/1989 Wada et al. .......... 350/347 R
4,889,412 12/1989 Clerc et al. .......... 350/347 R
4,957,349 9/1990 Clerc et al. .......... 350/347 R FOREIGN PATENT DOCUMENTS
0367288 5/1990 European Pat. Off. ........ 350/347 R
0379315 7/1990 European Pat. Off. ........ 350/347 R
0271415 11/1988 Japan .................. 350/347 R Primary Examiner—Stanley D. Miller
Assistant Examiner—Anita Pellman Gross
Attorney, Agent, or Firm—Townsend and Townsend

[57] ABSTRACT

This invention relates to an STN liquid crystal display device and a retardation means, in which coloring caused by wavelength dependency of a birefringent effect is compensated for and decolored by using a novel combination of retardation films. At least a pair of retardation films manufactured by stretching a polymeric film and having positive and negative intrinsic birefringence values are arranged such that their main stretching directions cross each other. Coloring is decolored and at the same time viewing angle dependency of display is minimized by this arrangement. Decolored black-and-white display having small viewing angle dependency can be obtained, bright display with less light absorption is realized, and the thickness of the display device can be decreased.

5 Claims, 3 Drawing Sheets

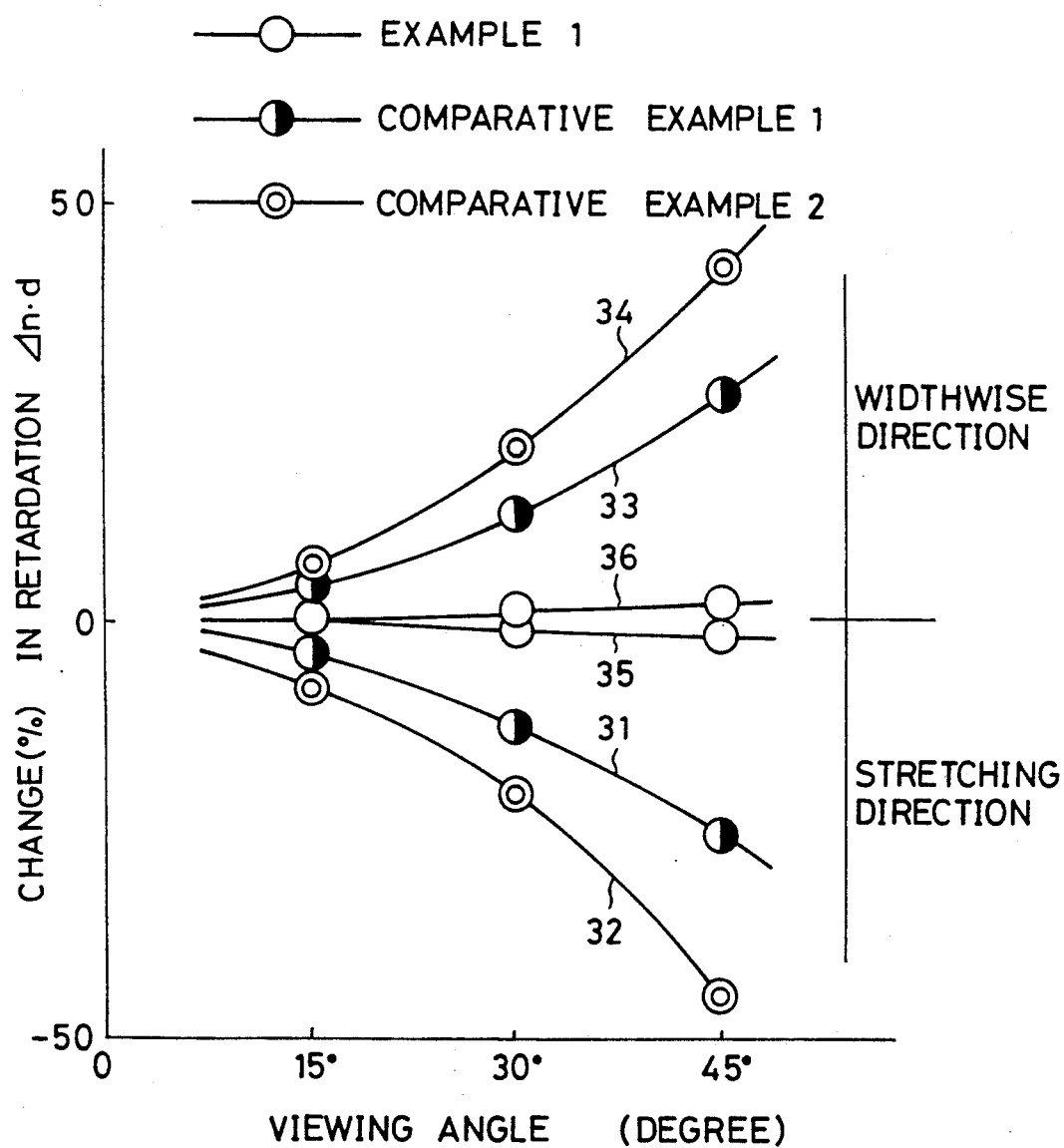

LIQUID CRYSTAL DISPLAY DEVICE AND RETARDATION FILM

TECHNICAL FIELD

The present invention relates to a liquid crystal display device and a retardation film, in which coloring in a birefringent liquid crystal display device is decolored by compensation using a retardation film.

PRIOR ART

As an improved twisted liquid crystal display device in which a nematic liquid crystal panel having a twisting angle of 90° is arranged between a pair of polarizing plates, a device which realizes a sharp change in light transmittance with respect to a drive voltage by increasing the twisting angle to be about 270° is known as an STN (Super example, U.S. Pat. No. 4,634,229).

In this STN liquid crystal display device, the polarizing direction of polarizing plates is arranged to cross the orientation direction of liquid crystal molecules, and high contrast is obtained by a birefringent effect derived from this arrangement.

Because the birefringent effect has wavelength dependency, when white light is transmitted through a birefringent liquid crystal display device, the transmitted light is undesirably colored.

In order to obtain full color display by using color filters of primaries R, G, and B in combination with this liquid crystal display device, therefore, coloring caused by the wavelength dependency of the birefringent effect must be decolored.

As a method of decoloring coloring in the STN liquid crystal display device, a method in which an optical anisotropic layer is arranged together with an STN liquid crystal panel between a pair of polarizing plates so that the effect of the former is compensated for by the birefringent effect of the latter to obtain a colorless state is proposed (see, for example, U.S. Pat. No. 4,844,569).

In this case, although a second twisted liquid crystal panel or a retardation film is used as the optical anisotropic layer, the retardation film consisting of a stretched polymeric film is more advantageous in terms of a manufacturing cost.

When a polymeric film is uniaxially or biaxially stretched, polymer molecules are mainly oriented in a direction along which a stretching ratio is highest, i.e., in a main stretching direction to obtain a retardation film having optical anisotropy. In this case, assuming that a refractive index in the stretching direction is $n_e$ and that in a direction perpendicular to the stretching direction in a film plane, i.e., in a widthwise direction is $n_o$, a value of $n_e - n_o = \Delta n$ is called a refractive index anisotropy or orientation birefringence. This value is determined by an intrinsic birefringent value, i.e., a specific optical anisotropy of a monomer which is a constituting unit of the polymeric film and a degree of orientation of high molecules. $n_e > n_o$ is obtained in an orientation film formed by stretching a polymeric material in which a refractive index in a molecular axis direction is larger than that in a direction perpendicular to the molecular axis direction, i.e., a polymeric material having a positive intrinsic birefringence value.

$n_e < n_o$, on the other hand, is obtained in an orientation film formed by stretching a polymeric material having a negative intrinsic birefringence value.

A product $\Delta n \cdot d$ of the refractive index anisotropy $\Delta n$ and a film thickness d is called a retardation. In addition, the main stretching direction is sometimes called an optical axis for convenience.

By optimally-balancing the retardation $\Delta n \cdot d$ of a retardation film with the product $\Delta n \cdot d$ of the refractive index anisotropy $\Delta n$ of a liquid crystal and the thickness d of a liquid crystal layer and arranging the optical axis direction of the retardation film through an optimal angle with respect to the orientation direction of liquid crystal molecules, coloring caused by the birefringent effect of a liquid crystal panel can be compensated for to decolor a liquid crystal display device.

The above description is based on observation obtained when the liquid crystal display device is viewed from the front. When the device is viewed in an oblique direction, since values of $\Delta n \cdot d$ of the liquid crystal layer and the retardation $\Delta n \cdot d$ of the retardation film change, the coloring compensation conditions are lost. In this case, $\Delta n \cdot d$ of the retardation film varies more largely than that of the liquid crystal layer. In order to eliminate viewing angle dependency of the display device, therefore, it is most important to minimize viewing angle dependency of the retardation of the retardation film.

In view of the foregoing, there has been proposed a method of laminating a plurality of retardation films such that their optical axes are twistedly oriented (Japanese Patent Laid-Open No. 2-53025) or a method of overlapping two retardation films having positive and negative refractive index anisotropies with their stretching directions parallel to each other (Japanese Patent Laid-Open No. 2-67518), but neither methods can eliminate viewing angle dependency of the retardation $\Delta n \cdot d$. In addition, light transmittance is undesirably decreased because the thickness d of the retardation film must be increased to obtain a required retardation.

The present invention, therefore, arranges a retardation means having small viewing angle dependency of the retardation, using a combination of a plurality of anisotropic polymeric films within an allowable thickness range and provides an STN liquid crystal display device which is decolored by compensating for coloring by using the retardation means.

DISCLOSURE OF INVENTION

In the present invention, a first retardation film having a positive intrinsic birefringence value and a second retardation film having a negative intrinsic birefringence value, both of which are manufactured by stretching a polymeric film, are arranged so that their stretching directions essentially cross each other and disposed together with an STN liquid crystal panel between a pair of polarizing plates.

BRIEF DESCRIPTION OF THE DRAWINGS

FIG. 2 is a graph showing a change in retardation caused by viewing angle dependency of a retardation film according to an embodiment of the present invention, compared to comparative examples of independent retardation films.

BEST MODE OF CARRYING OUT THE INVENTION

Before description of an embodiment of the present invention, birefringence of a retardation film formed by stretching a polymeric film and viewing angle dependency of a retardation $\Delta n \cdot d$ will be described below with reference to the accompanying drawings.

Figure 1:
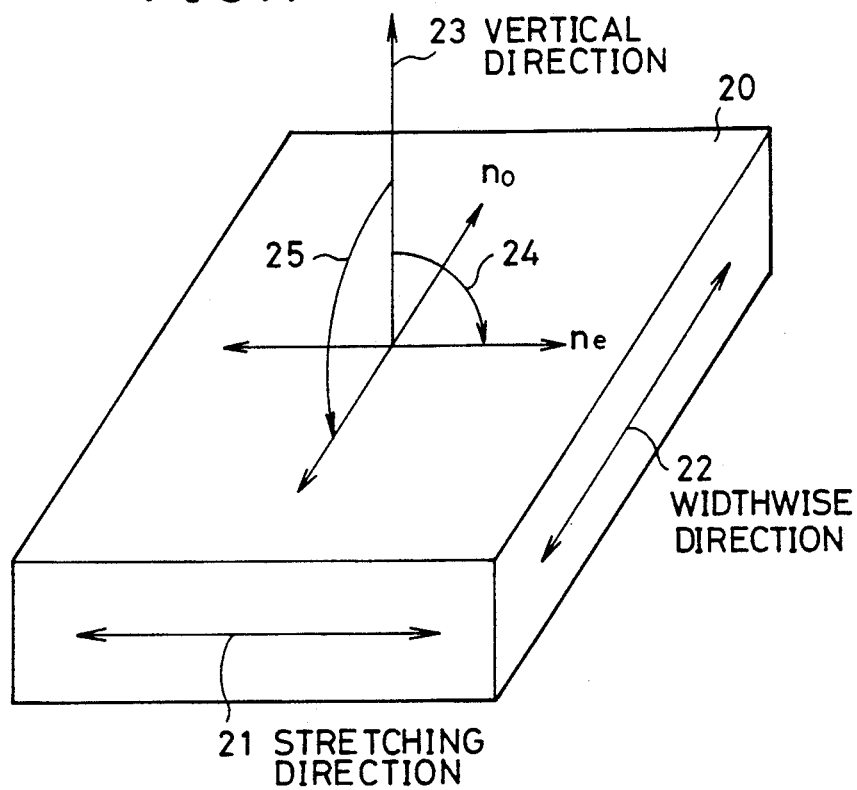
FIG. 1 is a perspective view showing a retardation film, for explaining a relationship between a stretching direction and optical characteristics of a retardation film formed by stretching a polymeric film.

FIG. 1 is a perspective view showing a retardation film 20 formed by stretching a polymeric film.

Assuming that a refractive index in a stretching direction 21 is $n_e$ and that in a direction perpendicular to the stretching direction in a retardation film plane, i.e., in a widthwise direction 22 is $n_o$, $n_e - n_o = \Delta n$ is called birefringence or orientation birefringent value, and a product $\Delta n \cdot d$ of $\Delta n$ and a thickness d of the retardation film is a retardation.

When a viewing point is moved along a curved arrow 24 from a position immediately above the retardation film while a viewing direction (observation direction) is set to agree the stretching direction 21, a change in retardation $\Delta n \cdot d$ observed in a vertical direction 23 is decreased as indicated by curves 31 and 32 shown in FIG. 2. When the viewing point is moved along a curved arrow 25 from the position immediately above the retardation film while the viewing direction is set to agree the widthwise direction 22, the change in retardation $\Delta n \cdot d$ is increased as indicated by curves 33 and 34 shown in FIG. 2.

By overlapping a first retardation film having a positive intrinsic birefringence value $n_{e1} - n_{o1} > 0$ and a second retardation film having a negative intrinsic birefringence value $n_{e2} - n_{o2} < 0$ such that their stretching directions are substantially perpendicular to each other, therefore, the widthwise direction along which the viewing angle dependency of a retardation is increased is combined with the stretching direction along which it is decreased, and a synthetic viewing angle dependency becomes very small as indicated by curves 35 and 36 shown in FIG. 2.

In addition, since larger refractive indexes ($n_{e1}$ and $n_{o2}$) of the first and second retardation films are superposed on each other and their smaller refractive indexes ($n_{o1}$ and $n_{e2}$) are superposed on each other, the anisotropy $\Delta n$ of a synthetic refractive index becomes sufficiently large to realize a satisfactory retardation $\Delta n \cdot d$ even by a comparatively thin retardation means.

Note that FIG. 2 is a graph showing a change in retardation $\Delta n \cdot d$, caused by the viewing angle dependency, of each of Example 1 and Comparative Examples 1 and 4 to be described later.

An embodiment of a liquid crystal display device according to the present invention will be described below with reference to FIGS. 3 and 4.

Figure 3:
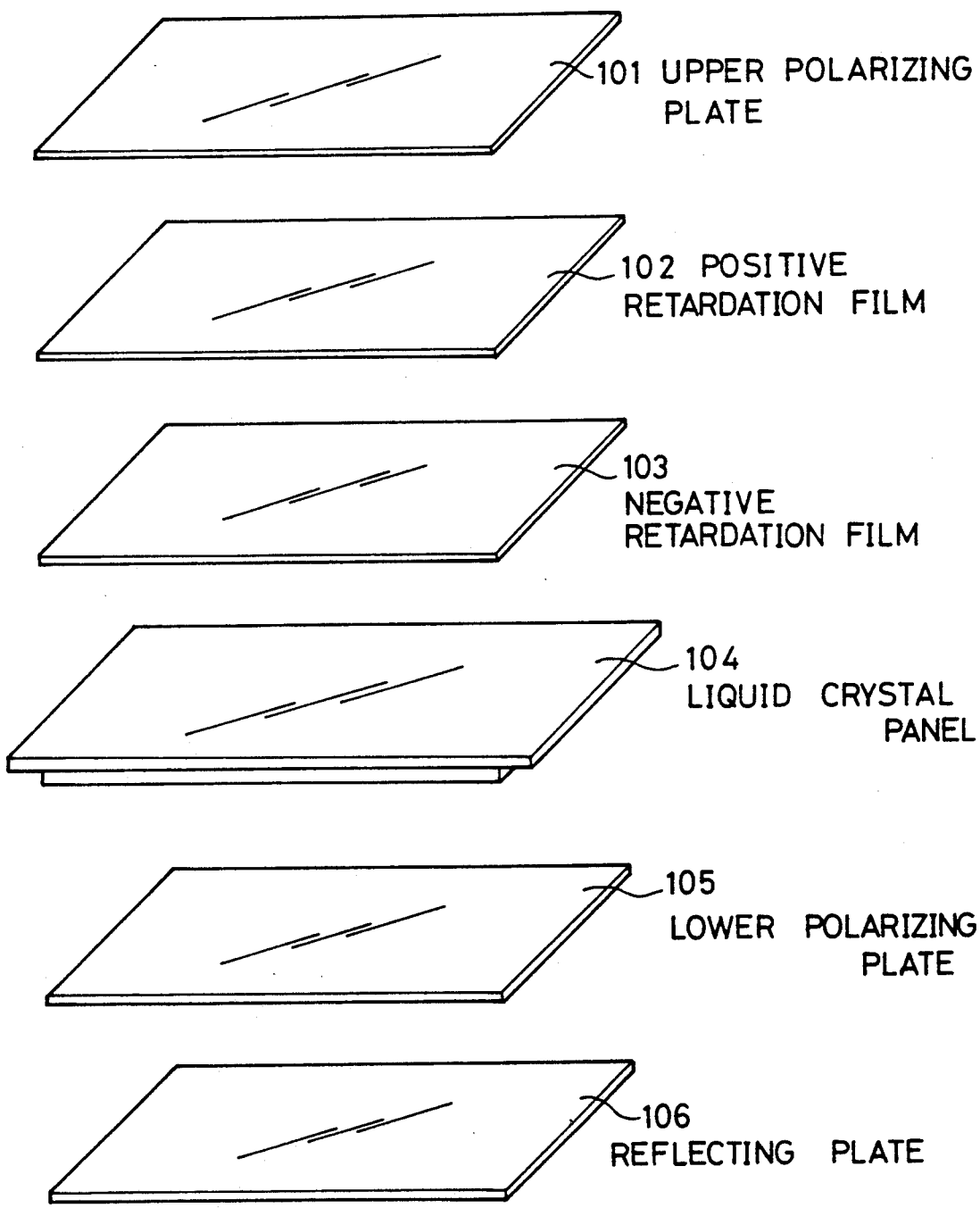
FIG. 3 is a developed perspective view showing an arrangement of an embodiment of a liquid crystal display device according to the present invention.

FIG. 3 is a developed perspective view showing an arrangement of the embodiment of a liquid crystal display device according to the present invention.

Referring to FIG. 3, a retardation film 102 having a positive intrinsic birefringence value and a retardation film 103 having a negative intrinsic birefringence value are overlapped and arranged above an STN liquid crystal panel 104, and these three members are arranged between a pair of polarizing plates, i.e., upper and lower polarizing plates 101 and 105. A reflecting plate 106 for allowing the display device to be observed as a reflection-type device is arranged below the lower polarizing plate 105.

Figure 4:
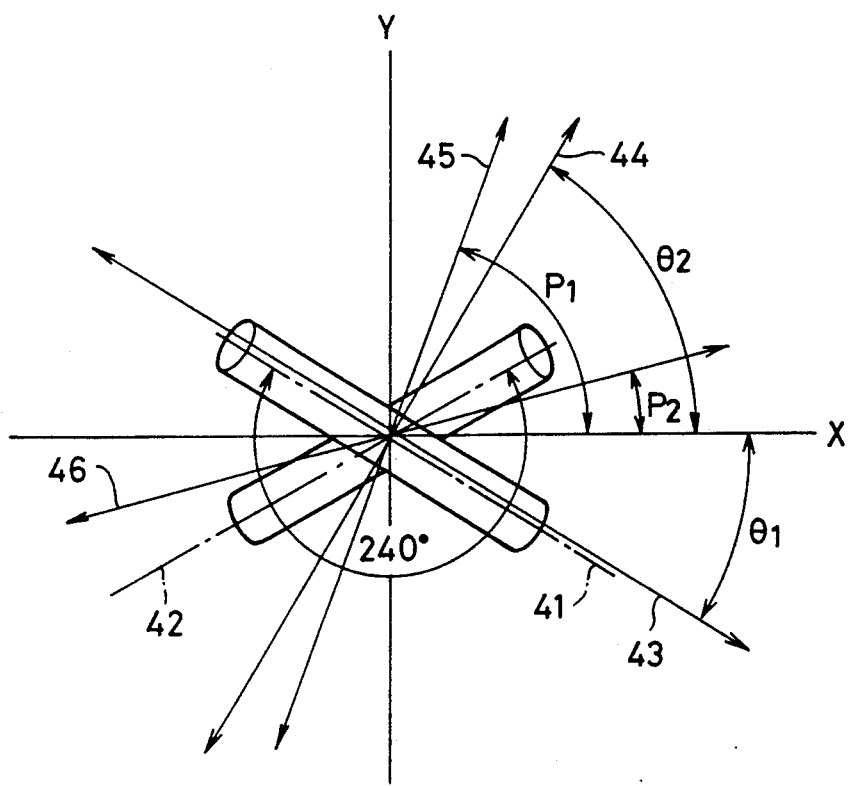
FIG. 4 is a front view showing a relationship between the optical directions of members constituting the liquid crystal display device shown in FIG. 3.

FIG. 4 is a front view showing a relationship between the optical directions of the constituting members shown in FIG. 3.

The liquid crystal panel 104 is an STN liquid crystal panel having positive dielectric anisotropy, in which nematic liquid crystals having refractive index anisotropy $\Delta n = 0.150$ are oriented in liquid crystal layer thickness $d = 6.4$ $\mu$m to form a left-handed twisted structure having a twisting angle of 240°. The $\Delta n \cdot d$ value of the liquid crystal panel 104 is 960 nm.

Referring to FIG. 4, an alternate long and short dashed line 41 represents the orientation direction of liquid crystal molecules in an upper portion of the liquid crystal layer, and an alternate long and short dashed line 42 represents that in its lower portion. A twisting angle between the upper and lower orientation directions 41 and 42 is 240°, and an X-Y orthogonal coordinate system is defined such that a direction dividing this twisting angle into two equal parts is taken as the Y axis.

The retardation $\Delta n \cdot d$ of the negative retardation film 103 is $-310$ nm, and its main stretching direction is set to coincide with the direction of a straight line 43. An angle $\theta_1$ defined between the line 43 and the X axis is set at 30°.

The retardation of the positive retardation film 102 is $+310$ nm, and its main stretching direction is set to coincide with the direction of a straight line 44. An angle $\theta_2$ defined between the line 44 and the X axis is set at 60°.

The polarization axis of the upper polarizing plate 101 is set along the direction of a straight line 45, and an angle $P_1$ defined between the line 45 and the X axis is set at 75°. The polarization axis of the lower polarizing plate 105 is set along the direction of a straight line 46, and an angle $P_2$ defined between the line 46 and the X axis is 15°.

The material of the retardation means according to the present invention will be described below.

Note that the retardation means of the present invention can be effectively applied to an industrial brilliancy analyzer, a circular dichroism device, a polarizing microscope, an antireflection plate, and the like as well as a liquid crystal display device.

Examples of a material having a positive intrinsic birefringence value are a transparent homopolymer or copolymer of, e.g., a polycarbonate resin, a cellulosediacetate resin, a polyphenyleneoxide resin, a polyester resin such as a polyethyleneterephthalate resin and a polyvinylalcohol-based resin, examples of a material having a negative intrinsic birefringent value are a transparent homopolymer or copolymer of, e.g., a poly(meth)-acrylate resin, an unsaturated aromatic compound resin such as polystyrene, and a mixture or polymer alloy mainly consisting of the homopolymer or copolymer.

In particular, a polycarbonate resin, a cellulosediacetate resin, an acrylic resin mainly consisting of a methacrylate, and a styrene-based resin all of which have good transparency, mainly consisting of styrene are preferred.

Table 1 shows the results obtained by measuring the viewing angle dependency of a retardation of each of retardation films having a positive or negative intrinsic birefringence value, manufactured by stretching the polymeric materials as described above, and retardation means obtained by combining the retardation films thus manufactured such that their main stretching directions are substantially perpendicular to each other.

The viewing angle dependency is represented by an average value (%) of absolute values of changes in retardation observed when a viewing angle is inclined with respect to two orthogonal directions corresponding to the stretching and widthwise directions as shown in FIG. 1. As shown in FIG. 2, the retardation is increased when the viewing angle is inclined in one direction and is decreased in the other direction, but absolute values of the changes are substantially equal to each other in the two directions.

TABLE 1

| | Arrangement | | | |
|---|---|---|---|---|
| | Intrinsic Birefringence Value (Positive) | | Intrinsic Birefringence Value (Negative) | |
| | Resin | Stretching Method (Ratio) | Resin | Stretching Method (Ratio) |
| Example 1 | PC | Uniaxial (2.5) | PS | Uniaxial (1.5) |
| Example 2 | PC | Uniaxial (2.5) | PS | Uniaxial (1.5) |
| Example 3 | PC | Uniaxial (2.5) | PS | Uniaxial (2.5) |
| Example 4 | PC | Uniaxial (2.5) | PS | Biaxial (2.5 × 1.1) |
| Comparative Example 1 | PC | Uniaxial (2.5) | — | — |
| Comparative Example 2 | — | — | PS | Uniaxial (2.5) |
| Comparative Example 3 | — | — | PS | Biaxial (2.5 × 1.1) |
| Example 5 | PC | Biaxial (2.2 × 1.1) | Acryl | Uniaxial (1.5) |
| Example 6 | PC | Biaxial (2.2 × 1.1) | Acryl | Biaxial (3.5 × 1.1) |
| Comparative Example 4 | PC | Biaxial (2.2 × 1.1) | — | — |
| Example 7 | PC | Uniaxial (2.5) | MS | Uniaxial (2.5) |
| Example 8 | DAC | — | PS | Uniaxial (1.5) |
| Comparative Example 5 | DAC | — | — | — |

Examples and comparative examples obtained by the present inventors by manufacturing retardation means using various materials under various conditions will be described below.

EXAMPLES 1–4

Constant-width uniaxial stretching was performed for a polycarbonate resin (A-2500 available from Idemitsu Sekiyu Kagaku K.K.) at a stretching temperature of 185° C. and a stretching ratio of 2.5 times to form an anisotropic film having a thickness of 205 μm and a retardation of 124 nm. A free-width uniaxially stretched product, constant-width uniaxially stretched products, and a biaxially stretched product respectively obtained from a polystyrene resin (DIAREX HF-77 available from Mitsubishi Monsant K.K.) at a stretching temperature of 120° C. and stretching ratios of 1.5 times, 1.5 and 2.5 times, and 2.5×1.1 times were independently overlapped on the above anisotropic film such that their main stretching directions became perpendicular to each other, thereby manufacturing retardation means.

The viewing angle dependencies of the manufactured retardation means were small, as shown in Table 1.

Note that the thicknesses and retardations of the polystyrene resin anisotropic films were 275 μm and −313 nm, 215 μm and −157 nm, 134 μm and −296 nm, and 122 μm and −220 nm, respectively.

COMPARATIVE EXAMPLES 1–3

The viewing angle dependencies of the polycarbonate resin anisotropic film used in Example 1 and the polystyrene resin anisotropic films used in Examples 3 and 4 were independently measured. As a result, the measurement values were large, as shown in Table 1.

EXAMPLE 5

Biaxial stretching was performed for a polycarbonate resin at a stretching temperature of 180° C. and a stretching ratio of 2.2×1.1 times to form an anisotropic film having a thickness of 198 μm and a retardation of 106 nm. A constant-width uniaxially stretched product having a thickness of 324 μm and a retardation of −138 nm, obtained from an acrylic resin (PARAPET SH available from Kyowa Gas Kagaku Kogyo K.K.) at a stretching temperature of 130° C. and a stretching ratio of 1.5 times was overlapped on the above anisotropic film such that their main stretching directions became perpendicular to each other, thereby manufacturing a retardation means.

The viewing angle dependency of this retardation means was small, as shown in Table 1.

When solvent resistances against butyl acetate and toluene were tested on the acrylic resin anisotropic film side, good results were obtained without causing any changes including whitening.

COMPARATIVE EXAMPLE 4

When the viewing angle dependency of the polycarbonate resin anisotropic film used in Example 5 was independently measured, the measurement result was large, as shown in Table 1. In addition, the film was whitened by a solvent resistance test using butyl acetate and toluene.

EXAMPLE 6

A biaxially stretched product having a thickness of 324 μm and a retardation of −109 nm, obtained from an acrylic resin at a stretching temperature of 130° C. and a stretching ratio of 3.5×1.5 times was overlapped on the polycarbonate resin anisotropic film used in Example 5, thereby manufacturing a retardation means.

The viewing angle dependency of this retardation means was small, as shown in Table 1. In addition, this acrylic resin anisotropic film had higher strength than that of a uniaxially stretched product and was easier to handle, and the impact strength of a retardation means manufactured by using this film was improved.

EXAMPLE 7

A constant-width uniaxially stretched product having a thickness of 124 μm and a retardation of −254 nm, obtained from an MS resin (ESTYRENE MS-300 available from Shinnittetsu Kagaku K.K.) at a stretching temperature of 130° C. and a stretching ratio of 2.5 times was overlapped on the polycarbonate resin anisotropic film used in Example 1 such that their main stretching directions became perpendicular to each other, thereby manufacturing a retardation means.

The viewing angle dependency of this retardation means was small, as shown in Table 1.

EXAMPLE 8

The polystyrene resin constant-width uniaxially stretched product used in Example 2 was overlapped on a cellulosediacetate resin quarter-wave plate (FUJI-TACK available from Fuji Photo Film Co., Ltd.) such that their stretching directions became perpendicular to each other, thereby manufacturing a retardation means.

The viewing angle dependency of this retardation means film was small, as shown in Table 1.

COMPARATIVE EXAMPLE 5

When the viewing angle dependency of the cellulosediacetate resin used in Example 8 was measured, the measurement value was large, as shown in Table 1.

It was confirmed by the present inventors that in the liquid crystal display device arranged as shown in FIGS. 3 and 4, a coloring phenomenon caused by the wavelength dependency of birefringence of the liquid crystal panel was effectively eliminated to realize essentially decolored black-and-white display. In addition, the viewing angle dependency was minimized, and essentially no significant change was found in quality of the display at an inclination angle of the viewing angle of up to about 45° in all directions.

Note that the reflecting plate 106 is a member for observing the liquid crystal display device as a reflection type device and therefore can be omitted when the device is to be observed as a transmission type device.

Although the STN liquid crystal panel having a twisting angle of 240° is exemplified in the above embodiment, the present invention can be effectively applied to any liquid crystal panels having a problem of coloring caused by a birefringent effect. Practically, the present invention is applied to an STN liquid crystal panel having a twisting angle of 180° to 300°.

In the present invention, it is important to arrange at least one pair of retardation films having positive and negative intrinsic birefringence values such that their main stretching directions cross each other, but the crossing angle need not be the right angle, 90° as described in the above embodiment.

Although the retardation of each retardation film, $\Delta n \cdot d$ of the liquid crystal panel, and a relative arrangement angle with respect to the orientation direction of liquid crystal molecules must be totally optimized, the effect of crossing the positive and negative retardation films is achieved within the range of a crossing angle of 90°±35° with respect to the right angle, 90°, as the center.

In addition, in the above embodiment, a pair of positive and negative retardation films are overlapped and arranged on one side of the liquid crystal panel. But decoloring of the liquid crystal display device and elimination of the viewing angle dependency can be optimized by combining a plurality of other retardation films and arranging the retardation films on both the sides of the liquid crystal panel.

In the present invention, by crossing the retardation films having positive and negative specific birefringent values, the viewing angle dependencies cancel each other, and at the same time the refractive index anisotropies are synthesized. Therefore, a satisfactory retardation can be obtained by a combination of comparatively thin retardation films, and a loss derived from light absorption can be reduced.

For this reason, in an STN liquid crystal display device, not only the coloring and viewing angle dependency can be eliminated but also the contrast and brightness can be improved and the thickness of the device can be decreased.

We claim:

1. A liquid crystal display device comprising a liquid crystal panel constituted by a nematic liquid crystal layer with positive dielectric anisotropy, having a twisted structure with a twisting angle of 180° to 300° and a pair of electrode substrates for sandwiching said liquid crystal layer, a pair of polarizing plates arranged on both the sides of said liquid crystal panel, and a retardation means for color compensation arranged between said pair of polarizing plates, characterized in that said retardation means is constituted by a combination of at least two retardation films, i.e., a first retardation film having a positive intrinsic birefringence value and a second retardation film having a negative intrinsic birefringence value, manufactured by stretching a polymeric film and arranged such that main stretching directions thereof cross each other within an angle range of 90°±35°.

2. A liquid crystal display device according to claim 1, characterized in that said retardation film is a uniaxially stretched product or an anisotropic biaxially stretched product of a polymeric film.

3. A liquid crystal display device according to claim 1, characterized in that said first retardation film is a stretched film consisting of a polycarbonate resin or a cellulosediacetate resin.

4. A liquid crystal display device according to claim 1, characterized in that said second retardation film is a stretched film consisting of an acrylic resin or a styrene-based resin.

5. A retardation means comprising a multilayered body of at least two retardation films, i.e., a first retardation film having a positive intrinsic birefringence value and a second retardation film having a negative intrinsic birefringence value, characterized in that said first and second retardation films are manufactured by stretching a polymeric film and arranged such that main stretching directions thereof cross each other within an angle range of 90°±35°.

* * * * *

UNITED STATES PATENT AND TRADEMARK OFFICE
CERTIFICATE OF CORRECTION

PATENT NO. : 5,093,739

DATED : March 3, 1992

INVENTOR(S) : Kazuhiko Aida

It is certified that error appears in the above-identified patent and that said Letters Patent is hereby corrected as shown below:

Title page , delete under "Assignee:" "Citizen Watch Co., Okayama, Japan" and insert --Citizen Watch Co., Ltd., Okayama, Japan and Kuraray Co., Ltd., Okayama, Japan--

Signed and Sealed this

Third Day of November, 1992

Attest:

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 5,093,739
DATED : March 3, 1992
INVENTOR(S) : Kazuhiko Aida

It is certified that error appears in the above—identified patent and that said Letters Patent is hereby corrected as shown below:

Title page, item [73], Assignee,

After "Citizen Watch Co., Ltd.," delete "Okayama" and insert --Tokyo--.

This Certificate supersedes Certificate of Correction issued November 3, 1992.

Signed and Sealed this

Twentieth Day of September, 1994

Attest:

BRUCE LEHMAN

Attesting Officer

Commissioner of Patents and Trademarks